Patented Apr. 28, 1942

2,281,087

UNITED STATES PATENT OFFICE 2,281,087

RUBBER CEMENT

Walter M. Kutz, Pittsburgh, Pa., assignor to The Raolin Corporation, New York, N. Y., a corporation of West Virginia No Drawing. Application September 27, 1939, Serial No. 296,849

2 Claims. (Cl. 260—760)

This invention relates to rubber cements; and it comprises an improved process of making rubber cements, and especially rubber cements of reduced viscosity, wherein rubber is dispersed in a solvent in the presence of metallic copper, advantageously with heating under reflux, the copper serving to expedite the disaggregation or dispersion of the rubber and the production of a rubber cement or solution of low viscosity; the rubber cement so formed being especially adapted for subsequent chlorination to obtain rubber chloride of high quality; all as more fully hereinafter set forth and as claimed.

It has been known for some time that various useful rubber solutions, which are also known as rubber cements, can be prepared under various conditions and with various properties. The quality of the product as regards viscosity and some other important factors, varies somewhat with conditions of operation. In a prior application of Raynolds, Serial No. 245,293, there is described an advantageous process of obtaining rubber solutions of suitable viscosity and other characteristics for chlorination; and an earlier form of the process is described in North Patent 2,148,830.

In this acknowledged process, a dilute solution of rubber is first prepared, advantageously in a chlorine-resistant solvent, such as carbon tetrachloride. The rubber is used in the form of sheets, clippings, etc., of pale crepe, deproteinized rubber, or rubber in other suitable state. This solution is boiled under reflux for several hours to reduce its viscosity and eliminate water. Ordinarily, the solution contains less than 5 per cent of rubber, and solutions of about 1 to 3 per cent concentration are most suitable for commercial operations. Boiling such solutions for several hours under reflux reduces the viscosity of the solutions to such an extent that they may be readily chlorinated without gelling. Another important result of the boiling is that any water coming into the system with the rubber or with the solvent is eliminated by azeotropic distillation, escaping past the condenser. This water usually amounts to about 3 to 10 grams per pound of rubber, when using pale crepe rubber as the starting material.

After dehydrating and reducing the viscosity of the solution by boiling, the rubber solution, i. e., rubber cement, may be readily chlorinated by bubbling gaseous chlorine through the liquid. The rubber chloride is recovered from this solution, sometimes after purification, by precipitation with a non-solvent such as water, alcohol, or a petroleum fraction, or by other methods of precipitation known to the art. The complete procedure in a highly desirable process of chlorinating rubber is described in the acknowledged Raynolds application.

In all methods for producing rubber cement known prior to my invention, difficulties have been encountered in producing rubber solutions of relatively high concentration accompanied by sufficiently low viscosity. Likewise, the long time consumed in producing rubber cements of the type most suitable for chlorination was a characteristic disadvantage of processes known prior to my invention. It is generally desirable to obtain chlorinated rubber having at least 65 per cent chlorine content, and it was often found, prior to this invention, that excessive time and care were required in making rubber cements suitable for chlorinating to form rubber chlorides containing 65 per cent or more chlorine.

I have discovered that a rubber cement of low viscosity and other desirable characteristics can be obtained, and the processing time can be materially reduced, if the rubber is dispersed or processed in the presence of metallic copper. The copper may be present in any convenient form. For example, the copper may be in the apparatus employed, as in a copper vessel, a copper-lined vessel, or a copper agitator; or one or more sheets or other loose pieces of copper having sufficient surface area may be introduced into the system.

Heretofore it has generally been assumed that contact of copper with rubber is injurious to the rubber; in fact, if copper oxidizes, the rubber is rapidly destroyed. But whatever the injurious effects of copper on rubber in other relations may be, I have found that it is useful in bringing about the rapid solution or dispersion of rubber in making rubber cements, and that the resulting cements have viscosities and other properties which are highly advantageous, especially when the cement is subsequently chlorinated.

In a desirable embodiment of my invention, sheets of caoutchouc are placed in a vessel fitted with an agitator and reflux condenser, the vessel being previously charged with a suitable solvent. Carbon tetrachloride or another chlorine resistant solvent is advantageously employed when the cement is to be chlorinated, but other solvents such as benzol, carbon disulfide, and gasoline are also suitable. Present in the vessel is sufficient copper, in any desired form, to expedite the dispersion of the rubber. The liquid is agitated and boiled under the reflux, in the presence of the copper, until a solution of the desired viscosity is obtained. During this operation the solution or dispersion of rubber approaches a minimum viscosity, due to disaggregation of the rubber micelles. The desired viscosity is obtained in much less time than is required in the absence of the copper, the saving in time often being of the order of 75 per cent.

On conclusion of the disaggregation stage, it is usually desirable to distil over a small portion of the solvent, thus removing any traces of water that may have collected in the condenser. Operating in this manner, there is quickly produced an anhydrous rubber solution or cement of low viscosity and well adapted for chlorination. Upon treatment with chlorine gas, as described, a rubber chloride containing 65 per cent or more of chlorine is readily produced.

As previously stated, the presence of copper during the cement-making step expedites the dispersion of the rubber and lowers the viscosity of the product. It also makes possible the production of rubber chloride solutions of lower viscosity types. The results obtained in operating in accordance with this invention are illustrated, and compared with results previously obtainable, in the following tests:

I

Commercial deproteinized rubber to the amount of 68 parts by weight was added to 4700 parts by weight of carbon tetrachloride, in a 5-liter glass vessel fitted with a stirring device and a reflux condenser. Copper sheet weighing 40 grams and having 24 square inches of surface was introduced, and the mixture was stirred and heated to the boiling temperature for 2 hours. The resulting rubber solution had a viscosity of 60 centipoises measured at 25° C. on a Stormer viscosimeter. A portion of the solvent was distilled to remove any collected water, and the rubber solution was then treated with chlorine gas, as described below.

II

The same process as employed in I was repeated, but with the copper omitted. After agitation and boiling for 2 hours, the rubber solution which resulted had a viscosity of 120 centipoises, measured at 25° C. on a Stormer viscosimeter. A portion of the solvent was distilled to remove any collected water, as before, and the rubber solution was then treated with chlorine gas as described below.

III

The rubber solution from I was treated with 240 grams of chlorine gas over a 3 hour period. Ultra violet light was used to facilitate the reaction. The resulting chlorinated rubber had a chlorine content of 65 per cent. A 20 per cent solution of this final product in toluol had a viscosity of 420 centipoises at 25° C.

IV

The rubber solution from II was treated with 240 grams of chlorine gas over a 3 hour period, with ultra violet light employed to facilitate the reaction, as in III. The chlorinated rubber had a chlorine content of 63.5 per cent. A 20 per cent solution of this final product in toluol had a viscosity of 1400 centipoises at 25° C.

The results obtained in these tests and others of like nature show clearly that the presence of copper during the production of a rubber cement makes possible the attainment of rubber solutions of low viscosity in a short time, and expedites the dispersion and disaggregation of the rubber in the solvent. These tests also show that in producing a rubber chloride of high chlorine content it is desirable to use a rubber solution prepared in accordance with this invention. In commercial operations, the reduction in the boiling time (from 8 hours or more to about 2 hours) required to produce rubber cements for chlorination is important; and this reduction effected by my invention results in substantial savings in heat units as well as operating labor and supervision.

What I claim is:

1. The method of producing a rubber cement of low viscosity in a short time, which consists of dispersing rubber in a non-aqueous solvent therefor and boiling the dispersion under reflux in the presence of metallic copper for a period of about two hours.

2. In the manufacture of rubber cements of low viscosity by heating a dispersion of rubber in a non-aqueous solvent therefor until the desired viscosity is attained, the improvement which consists in heating the said dispersion under reflux in contact with metallic copper and thereby obtaining a cement of the desired viscosity in a heating time on the order of 25 per cent as great as that required when heating under similar conditions but in the absence of the said copper.

WALTER M. KUTZ.